United States Patent [19]
Shiojima

[11] Patent Number: 5,994,873
[45] Date of Patent: Nov. 30, 1999

[54] CORRECTION DEVICE AND CORRECTION METHOD FOR SECONDARY BATTERIES CONNECTED IN SERIES

[75] Inventor: Nobuo Shiojima, Tokyo, Japan

[73] Assignee: Toshiba Battery Co., Ltd., Tokyo, Japan

[21] Appl. No.: 08/990,808

[22] Filed: Dec. 15, 1997

[30] Foreign Application Priority Data

Dec. 26, 1996 [JP] Japan .................................... 8-348544

[51] Int. Cl.$^6$ ........................................................ H02J 7/00
[52] U.S. Cl. ............................ 320/118; 320/116; 320/134; 320/136
[58] Field of Search ................................. 320/116, 118, 320/134, 135, 136

[56] References Cited

U.S. PATENT DOCUMENTS 5,206,578  4/1993  Nor ........................................ 320/118
5,547,775  8/1996  Eguchi et al. ......................... 320/118
5,602,481  2/1997  Fukuyama ............................ 324/434
5,646,503  7/1997  Stockstad .............................. 320/135

Primary Examiner—Peter S. Wong
Assistant Examiner—K. Shin
Attorney, Agent, or Firm—Oblon, Spivak, McClelland, Maier & Neustadt, P.C.

[57] ABSTRACT

A correction device for secondary batteries comprises a voltage difference detection circuit for detecting variation in terminal voltages of at least two secondary batteries connected in series, and a discharge circuit for discharging one of the at least two secondary batteries which has a maximum terminal voltage, when the variation in the terminal voltages exceeds a preset value. The discharge circuit stops discharging when the terminal voltage of the one of the secondary batteries which is discharged becomes lower than a reference value.

24 Claims, 2 Drawing Sheets

CORRECTION DEVICE AND CORRECTION METHOD FOR SECONDARY BATTERIES CONNECTED IN SERIES

BACKGROUND OF THE INVENTION

The present invention relates to a correction device and correction method for secondary batteries, and more particularly to a correction device and correction method for detecting a variation of terminal voltage of each of 2 or more secondary batteries connected in series and for correcting the variation thereof.

In a nonaqueous solvent secondary battery (e.g., a lithium secondary battery) or a lead secondary battery, a terminal voltage may become too low when it is discharged or left as it is for a long period of time, and too high when it is charged. In this case, the performance of the secondary battery may be deteriorated or the safety may be spoiled. To avoid this, it is necessary to monitor the terminal voltage of these types of secondary battery in order to control the charge and discharge of the secondary battery, so that the terminal voltage is kept within a predetermined range.

In particular, in the case of a lithium secondary battery, when the terminal voltage is 2 V or lower, copper of a collector used in the cathode begins dissolving in an electrolyte and the performance of the second battery is deteriorated. When the terminal voltage is 4.5 V or higher, the electrolyte is discomposed and gas is generated. As a result, the pressure in the secondary battery is increased, so that la safety valve may be operated and the liquid in the battery may be leaked. For this reason, in the case of a lithium secondary battery, charging and discharging operations are generally performed via a protecting circuit which has a function of cutting off a discharge current when the terminal voltage is lowered to a preset discharge prohibiting voltage and rises to a preset charge prohibiting voltage. The discharge prohibiting voltage is set to a value slightly higher than 2 V (e.g., 2.3 V), at which copper of the cathode begins to dissolve. The charge prohibiting voltage is set to a value slightly lower than a value at which the electrolyte begins to decompose (e.g., 4.35 V).

When a protecting circuit is used for a plurality of secondary batteries connected in series, the terminal voltages of the secondary batteries are detected individually and the same protecting operation is performed in the conventional protecting circuit. More specifically, terminal voltages of every secondary batteries are detected, and if the terminal voltage of one of second batteries is lowered to the discharge prohibitihg-voltage, the discharging operation is prohibited, and if the terminal voltage of one of second batteries rises above the charge prohibiting voltage, the charging operation is prohibited. Thus, the secondary batteries are protected.

However, when the conventional protecting circuit as described above is used for a plurality of secondary batteries connected in series, if the amount of charge or self-discharge of a secondary battery differs from that of another, the terminal voltages Of these secondary batteries are also different.

For this reason, during a discharging operation, the terminal voltage of a less-charged secondary battery may reach the discharge prohibiting voltage earlier than the other batteries. In this case, even if the average value of the terminal voltages of the secondary batteries is sufficiently high, the discharge may be stopped. Contrarily, during a charging operation, the terminal voltage of a more-charged secondary battery may reach the charge prohibiting voltage earlier than the other batteries. In this case, the secondary batteries as a whole cannot be fully charged, with the result that they can be used for a shorter period of time.

To avoid the above drawback, a troublesome process is required, i.e., it is necessary to make the terminal voltages equal before the secondary batteries are connected in series.

In an apparatus incorporating a volatile memory device (e.g., RAM), such as a personal computer, when the terminal voltage of a secondary battery used as a power source is lowered, data in the volatile memory device is transferred to a nonvolatile memory device, such as a hard disk, thereby preventing data from being lost. However, if the conventional protecting circuit is used in such an apparatus, the terminal voltage of a secondary battery, which is charged less or self-discharged more as compared to the other batteries, may lower to the discharge prohibiting voltage earlier than the other batteries. In this case, the protecting circuit immediately stops discharging at that time, even if the other secondary batteries have sufficiently high terminal voltages, e.g., even if the average of the terminal voltages of all the secondary batteries is sufficiently high. As a result, data in the volatile memory device is lost.

BRIEF SUMMARY OF THE INVENTION

An object of the present invention to provide a correction device for correcting variation in amount of charge or discharge of a plurality of second batteries connected in series, to prevent the problems which arise during charging and discharging operations as described above.

The gist of the present invention is to detect variation in the terminal voltages of a plurality of second batteries connected in series and to discharge the second batteries so to correct the variation.

A correction device according to the present invention comprises a voltage difference detection circuit for detecting variation in terminal voltages of at least two secondary batteries connected in series; and a discharge circuit for discharging one of the at least two secondary batteries which has a maximum terminal voltage, when the variation in the terminal voltages exceeds a preset value. In the correction device, the discharge circuit stops discharging when the terminal voltage of the one of the secondary batteries which is discharged becomes lower than a reference value. The correction device further comprises a circuit for discriminating whether the detected variation exceeds the preset value.

A correction method according to the present invention comprises the steps of: detecting variation in terminal voltages of at least two secondary batteries connected in series; and discharging one of the at least two secondary batteries which has a maximum terminal voltage, when the variation exceeds a preset value. The correction method further comprises the step of stopping discharging when the terminal voltage of the one of the secondary batteries which is discharged becomes lower than a reference value.

According to the present invention, when the terminal voltages of the secondary batteries connected in series vary for some reason and the variation exceeds a preset value, the secondary battery which has the maximum terminal voltage is discharged. The terminal voltage of this secondary battery is lowered to a voltage substantially equal to the terminal voltages of the other secondary batteries, thereby reducing the variation in-terminal voltage of the secondary batteries. In other words, the variation in terminal voltage of the secondary batteries, due to an amount of charge or self-discharge, is automatically corrected. As a result, during a discharging operation, the problem of immediate stop of discharge does not arise, i.e., the discharge is not stopped when the average of the terminal voltages of the secondary batteries is sufficiently high.

Therefore, when the secondary batteries are used as a power source of such a device as a personal computer, in which a volatile memory device is incorporated and when the terminal voltages of the secondary batteries are lowered, data in the volatile memory device is transferred to a nonvolatile memory device in order to prevent the data from being lost, even if the terminal voltage of a part of the secondary batteries is lowered earlier than those of the other secondary batteries to be the discharge prohibiting voltage, the discharge operation does not stop immediately. Thus, storage of data in the volatile memory device is ensured and lost of the data is prevented.

When the secondary batteries are charged, since all the batteries are charged uniformly, full charge of all the batteries is ensured. Therefore, the period of time in which the secondary batteries as a whole can be used is lengthened.

Further, it is unnecessary to perform a troublesome process, which is required in the conventional art, to make equal the terminal voltages of the secondary batteries before they are connected in series.

According to the present invention, the discharge circuit includes a plurality of switch elements and a plurality of resistor elements connected in series, the discharge circuit being connected in parallel to both ends of each of the at least two secondary batteries. With this configuration, ON/OFF of the discharging state is controlled by turning the switch elements on or off.

Further, according to the present invention, the voltage difference detection circuit detects a voltage difference, for example, in the following manner, as a difference representing variation of the terminal voltages of the secondary batteries.

(1) The voltage difference detection circuit detects a difference between the maximum value and a minimum terminal voltage of at least two secondary batteries.

(2) At least three secondary batteries are connected in series, and the voltage difference detection circuit detects a difference between a maximum terminal voltage and an average of the terminal voltages of the at least three secondary batteries. Thus, the structure of the voltage difference detection circuit is simplified.

(3) At least three secondary batteries are connected in series, and the voltage difference detection circuit detects a difference between a maximum terminal voltage and an average of the terminal voltages of the secondary batteries except the secondary battery which has the maximum terminal voltage. Thus, the structure of the voltage difference detection circuit is simplified.

Furthermore, according to the present invention, when the voltage difference detection circuit determines that the voltage difference exceeds a preset value, control means turns on the discharge circuit connected to the secondary battery which has the maximum terminal voltage and turns off the discharge circuit when the terminal voltage is lowered to a reference value. The control means control the discharge circuit in the following manner.

(1) The discharge circuit stops discharging, when the terminal voltage of the secondary battery which is discharged is lowered to a minimum terminal voltage.

(2) At least three secondary batteries are connected in series, and the discharge circuit stops discharging, when the terminal voltage of the secondary battery which is discharged is lowered to an average of the terminal voltages of the secondary batteries except the secondary battery which is discharged.

(3) At least three secondary batteries are connected in series, and the discharge circuit stops discharging, when the terminal voltage of the secondary battery which is discharged is lowered to an average of the terminal voltages of the at least three secondary batteries.

It is preferable that the discharge circuit prohibits discharging, when a voltage across first and second terminals of the at least two secondary batteries connected in series is equal to or lower than a predetermined value, or the discharge circuit prohibits discharging, when a maximum terminal voltage of each of the at least two secondary batteries is equal to or lower than a predetermined value.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

An embodiment of the present invention will be described with reference to the accompanying drawings.

Figure 1:
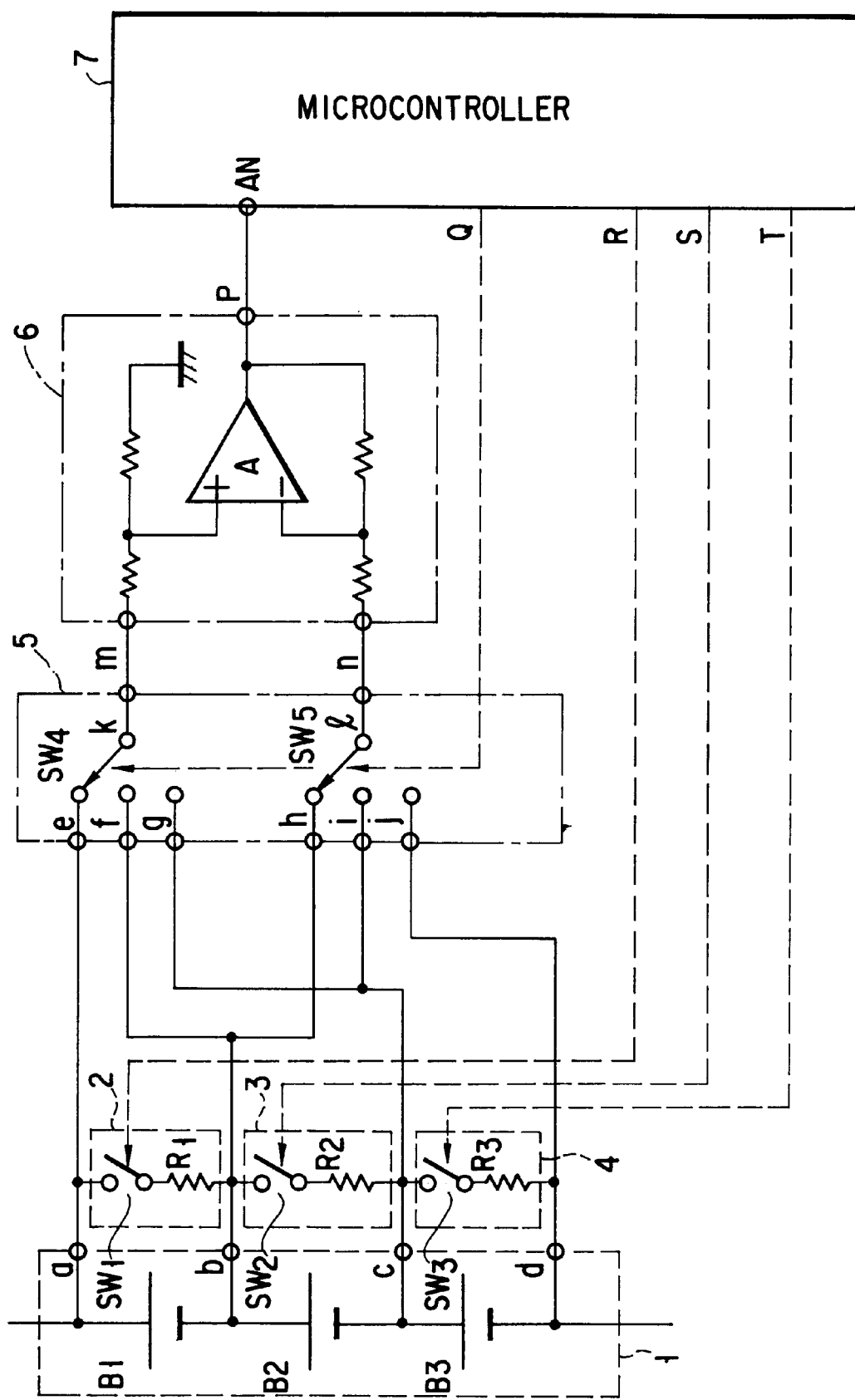
FIG. 1 is a block diagram showing a correction device for secondary batteries according to an embodiment of the present invention.

FIG. 1 is a block diagram showing a correction device for secondary batteries according to an embodiment of the present invention. In FIG. 1, a secondary battery group 1 comprises a plurality of (in this embodiment, three) secondary batteries B1, B2 and B3 connected in series. The positive terminal of the battery B1 is connected to an external connection terminal a, the negative terminal of the battery B1 and the positive terminal of the battery B2 are connected to an external connection terminal b, the negative terminal of the battery B2 and the positive terminal of the battery B3 are connected to an external connection terminal c, and the negative terminal of the battery B3 is connected to an external connection terminal d.

Switch elements SW1, SW2, and SW3 and discharging resistors R1, R2 and R3 constitute discharge circuits 2. More specifically, the switch element SW1 and the resistor R1 form a first discharge circuit 2, the switch element SW2 and the resistor R2 form a second discharge circuit 3, and the switch element SW3 and the resistor R3 form a third discharge circuit 4. The both ends of the first discharge circuit 2 are respectively connected to the external connection terminals a and b of the secondary battery group 1. The both ends of the second discharge circuit 3 are respectively connected to the external connection terminals b and c of the secondary battery group 1. The both ends of the third discharge circuit 4 are respectively connected to the external connection terminals c and d of the secondary battery group 1.

A switching circuit 5 comprises a first switch SW4 having switching contacts e, f and g and a common contact k and a second switch SW5 having switching contacts h, i and j and a common contact 1. The switches SW4 and SW5 are operated in association with each other. More specifically, when the common contact k is switched to the switching contact e, the common contact 1 is switched to the switching contact h. When the common contact k is switched to the switching contact f, the common contact 1 is switched to the switching contact i. When the common contact k is switched to the switching contact g, the common contact 1 is switched to the switching contact j. The switching contacts e, f and g of the first switch SW4 of the switching circuit 5 are respectively connected to the terminals a, b and c of the secondary battery group 1. The switching contacts h, i and j of the second switch SW5 are respectively connected to the terminals b, c and d of the secondary battery group 1.

The common terminals k and 1 of the first and second switches SW4 and SW5 of the switching circuit 5 are respectively connected to input terminals m and n of a differential amplifier 6. The differential amplifier 6 comprises an operational amplifier A and a plurality of resistors, and outputs a voltage corresponding to the difference in voltage between the input terminals m and n to an output terminal P. The switching circuit 5 and the differential amplifier 6 constitute a voltage measuring circuit for measuring terminal voltages of the secondary batteries B1, B2 and B3 of the second battery group 1.

The output terminal P of the differential amplifier 6 is connected to an input terminal AN of a microcontroller 7. The microcontroller 7 incorporates an A/D converter, which converts, to a digital value, a voltage output from the differential amplifier 6 and input to the input terminal AN. The microcontroller 7 executes a software processing from the digital value obtained by the A/D converter in accordance with an internal program. Based on the result of the software processing, it performs voltage difference detection for detecting a voltage difference which represents variation in the terminal voltages of the secondary batteries B1, B2 and B3 measured by the switching circuit 5, the differential amplifier 6 and the A/D converter. It also performs voltage difference judgment for judging whether the voltage difference exceeds a preset value.

At this time, the microcontroller 7 outputs from an output terminal Q a control signal for selecting a switching contact of the switching circuit 5 on the basis of a value N on an internal counter. In accordance with the control signal output from the output terminal Q, the common terminals k and 1 are respectively switched to the switching contacts e and h, when N=1, to the switching contacts f and i when N=2, and to the switching contacts g and j when N=3.

Based on the aforementioned voltage difference judgment, the microcontroller 7 controls ON/OFF of the switch elements SW1, SW2 and SW3 of the discharge circuits 2, 3 and 4. The microcontroller 7, further comprising three output terminals R, S and T, controls ON/OFF of the switch element SW1 of the discharge circuit 2 through the output terminal R, ON/OFF of the switch element SW2 of the discharge circuit 3 through the output terminal S and ON/OFF of the switch element SW3 of the discharge circuit 4 through the output terminal T.

Figure 2:
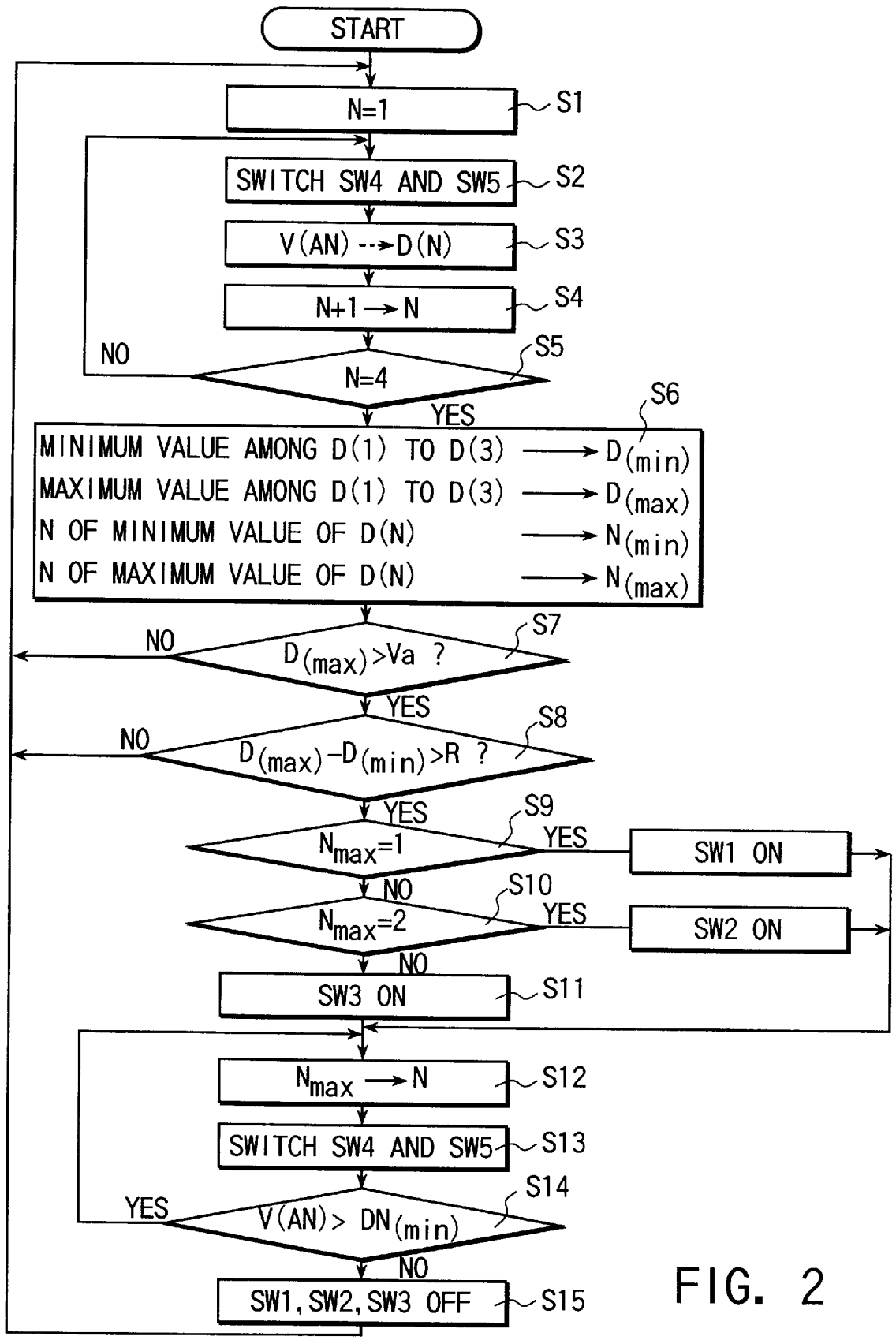
FIG. 2 is a flowchart for explaining an operation of the embodiment of the present invention.

An operation of the correction device for secondary batteries shown in FIG. 1 will be described with reference to the flowchart shown in FIG. 2.

When the circuit of the correction device starts operating, N is set to 1 as an initial state (step S1). In this case, the switches SW4 and SW5 of the switching circuit 5 select the secondary battery B1 (Step S2), and the differential amplifier 6 generates a voltage corresponding to the terminal voltage of the secondary battery B1. The output voltage from the differential amplifier 6 is input to the input terminal AN of the microcontroller 7. The microcontroller 7 converts the output voltage from the differential amplifier 6 to a digital value V(AN) by the A/D converter and stores the digital value as a memory value D(1) (step S3). In step S4, N+1→N is executed, with the result that N=2 is obtained. Then, the flow returns to step S2 through step S5 for determining whether N=4.

This time, since N=2, the switches SW4 and SW5 of the switching circuit 5 select the secondary battery B2 (step S2), and the differential amplifier 6 generates a voltage corresponding to the terminal voltage of the secondary battery B2. The output voltage from the differential amplifier 6 is input to the input terminal AN of the microcontroller 7. In the same manner as in the case of N=1, the microcontroller 7 converts the output voltage from the differential amplifier 6 to a digital value V(AN) by the A/D converter and stores the digital value as a memory value D(2) (step S3). In step S4, N+1→N is executed, with the result that N=3 is obtained. Then, the flow returns to step S2 through step S5 for determining whether N=4.

Next, the switches SW4 and SW5 of the switching circuit 5 select the secondary battery B3 based on N=3 (step S2), and the differential amplifier 6 generates a voltage corresponding to the terminal voltage of the secondary battery B3. The output voltage from the differential amplifier 6 is input to the input terminal AN of the microcontroller 7. In the same manner as in the cases of N=1 and N=2, the microcontroller 7 converts the output voltage from the differential amplifier 6 to a digital value V(AN) by the A/D converter and stores the digital value as a memory value D(3) (step S3). In step S4, N+1→N is executed, with the result that N=4 is obtained. Since the result of step S5 is "Yes", the flow advances to step S6.

In step S6, a minimum value of the memory values D(N) (N=1, 2, 3) is stored as a memory value D(min) and a maximum value thereof is stored as a memory value D(max). Further, the value N of a minimum value of D(N) is stored as Nmin and the value N of a maximum value of D(N) is stored as Nmax.

In step S7, the value D(max) is compared with a preset reference maximum value Va (for example, 4 V). If D(max) is equal to or lower than Va (if the result of step S7 is "No"), the flow returns to step S1. On the other hand, if the charge of the secondary batteries progresses, so that the terminal voltages thereof have risen and D(max) becomes higher than Va (if the result of step S7 is "Yes"), the flow advances to step S8. Then, the difference between D(max) and D(min) is compared with a preset reference voltage difference value R (for example, 100 m V) (step S8). In general, since there is substantial no difference among the terminal voltages of the secondary batteries B1, B2 and B3, D(max)−D(min)<R. Therefore, the result of step S8 is "No" and the flow returns to step S1.

On the other hand, if the terminal voltages of the secondary batteries B1, B2 and B3 have variation for some reason, for example, due to a difference in amount of charge or self-discharge and the result of step S8 is "Yes", the flow advances to step S9 and the subsequent steps. If Nmax=1 (if the result of step S9 is "Yes", the switch element SW2 is turned on. If Nmax≠1 and Nmax≠2, that is, Nmax=3 (if the results of steps S9 and S10 are "No"), the switch element SW3 is turned on (step S11). Thus, the switch of the discharge circuit, connected to that secondary battery B1, B2 or B3 which has the maximum terminal voltage, is turned on, so that the secondary battery can start discharging.

Subsequently, Nmax is set to N in step S12, and the switches SW4 and SW5 are switched (step S13). If the digital value V(AN) corresponding to the terminal voltage of the secondary battery which represents the maximum value in step S6 is greater than D(Nmin) (if the result of step S14 is "Yes"), the flow returns to step S12 to continue discharge for correction. If V(AN)≦D(Nmin) (if the result of step S14 is "No"), the flow advances to step S15. In step S15, the switches SW1 to SW3 are turned off to stop discharging. Thus, the discharge operation ceases.

As described above, according to the present invention, even if the terminal voltages of the secondary batteries B1, B2 and B3 have variation for some reason, the variation can be reduced by discharging the secondary battery which has the maximum terminal voltage to lower the terminal voltage.

The present invention is not limited to the above embodiments but can be variously modified as follows.

(1) In the above embodiment, three secondary batteries are connected in series. However, the correction device of the present invention can be applied to cases in which two, or four or more secondary batteries are connected in series.

(2) In the above embodiment, an operation of the discharge circuits 2, 3 and 4 is started when the difference between the maximum and minimum values of the terminal voltages of the secondary batteries B1, B2 and B3 is greater than the preset value. However, it can be started when the difference between the maximum terminal voltage and the average terminal voltage is greater than the preset value, or when the average of the terminal voltages except the maximum and minimum terminal voltages is greater than the preset value.

(3) In the above embodiment, the secondary battery which has the maximum terminal voltage is discharged until the terminal voltage becomes equal to the terminal voltage of another second battery, which has the minimum terminal voltage. However, the discharge may be stopped when the maximum terminal voltage is lowered to the average of the terminal voltages of all the secondary batteries, or the average of the terminal voltages of the secondary batteries except that having the maximum terminal voltage (i.e., the average of the terminal voltages of the secondary batteries which are not discharged).

(4) In the above embodiment, the secondary battery which has the maximum terminal voltage is discharged until the terminal voltage becomes equal to the terminal voltage of another second battery which has the minimum terminal voltage. However, the discharge may be stopped when the maximum terminal voltage is lowered to the average of the terminal voltages of a predetermined number of secondary batteries, or the average of the predetermined number of terminal voltages of the secondary batteries except that having the maximum terminal voltage (i.e., the average of the terminal voltages of the secondary batteries which are not discharged).

(5) In the above embodiment, the terminal voltages during a charging operation are monitored. However, the monitoring operation may be prohibited until a certain period of time has passed since the start of a charging operation, because the terminal voltages may be unstable immediately after the charging operation is started.

Further, the present invention can be modified variously within the scope of the invention. Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A correction device for secondary batteries for correcting a difference among the secondary batteries during a charge operation, comprising:
    a voltage difference detection circuit for detecting variation in terminal voltages of at least two secondary batteries connected in series; and
    a discharge circuit for discharging one of the at least two secondary batteries which has a maximum terminal voltage, when the variation in the terminal voltages exceeds a preset value.

2. The correction device for secondary batteries according to claim 1, wherein said discharge circuit stops discharging when the terminal voltage of the one of the secondary batteries which is discharged becomes lower than a reference value.

3. The correction device for secondary batteries according to claim 1, further comprising a circuit for discriminating whether the detected variation exceeds the preset value.

4. The correction device for secondary batteries according to claim 1, wherein said discharge circuit includes a plurality of switch elements and a plurality of resistor elements connected in series, said discharge circuit being connected in parallel to both ends of each of the at least two secondary batteries.

5. The correction device for secondary batteries according to claim 1, wherein said voltage difference detection circuit detects a difference between the maximum value and a minimum terminal voltage of at least two secondary batteries.

6. The correction device for secondary batteries according to claim 1, wherein at least three secondary batteries are connected in series, and the voltage difference detection circuit detects a difference between a maximum terminal voltage and an average of the terminal voltages of said at least three secondary batteries.

7. The correction device for secondary batteries according to claim 1, wherein at least three secondary batteries are connected in series, and the voltage difference detection circuit detects a difference between a maximum terminal voltage and an average of the terminal voltages of the secondary batteries except the secondary battery which has the maximum terminal voltage.

8. The correction device for secondary batteries according to claim 1, wherein said discharge circuit stops discharging, when the terminal voltage of the secondary battery which is discharged is lowered to a minimum terminal voltage.

9. The correction device for secondary batteries according to claim 1, wherein at least three secondary batteries are connected in series, and said discharge circuit stops discharging, when the terminal voltage of the secondary battery which is discharged is lowered to an average of the terminal voltages of the secondary batteries except the secondary battery which is discharged.

10. The correction device for secondary batteries according to claim 1, wherein at least three secondary batteries are connected in series, and said discharge circuit stops discharging, when the terminal voltage of the secondary battery which is discharged is lowered to an average of the terminal voltages of the at least three secondary batteries.

11. The correction device for secondary batteries according to claim 1, wherein said discharge circuit prohibits discharging, when a voltage across first and second terminals of said at least two secondary batteries connected in series is equal to or lower than a predetermined value.

12. The correction device for secondary batteries according to claim 1, wherein said discharge circuit prohibits discharging, when a maximum terminal voltage of each of the at least two secondary batteries is equal to or lower than a predetermined value.

13. A correction method of correcting a difference among secondary batteries connected in series during a charge operation, comprising the steps of:

detecting variation in terminal voltages of at least two secondary batteries connected in series; and discharging one of the at least two secondary batteries which has a maximum terminal voltage, when the variation exceeds a preset value.

14. The correction method according to claim 13, further comprising the step of stopping discharging when the terminal voltage of the one of the secondary batteries which is discharged becomes lower than a reference value.

15. The correction device according to claim 1, wherein said voltage difference detection circuit detects the terminal voltages of the secondary batteries by switching the terminal voltages of the secondary batteries to be detected in order.

16. The correction device for secondary batteries according to claim 2, further comprising a circuit for discriminating whether the detected variation exceeds the preset value.

17. The correction device for secondary batteries according to claim 2, wherein said discharge circuit includes a plurality of switch elements and a plurality of resistor elements connected in series, said discharge circuit being connected in parallel to both ends of each of the at least two secondary batteries.

18. The correction device for secondary batteries according to claim 2, wherein said voltage difference detection circuit detects a difference between the maximum value terminal voltage and a minimum terminal voltage of at least two secondary batteries.

19. The correction device for secondary batteries according to claim 2, wherein said voltage difference detection circuit detects the terminal voltages of the secondary batteries to be detected in order.

20. A correction device for secondary batteries for correcting a difference among the secondary batteries during a charge operation, comprising:

a direct voltage detection circuit for directly detecting a terminal voltage of each of at least two secondary batteries connected in series;

a voltage difference detection circuit for detecting variation in said terminal voltages of said at least two secondary batteries; and a discharge circuit for discharging one of the at least two secondary batteries which has a maximum terminal voltage, when the variation in the terminal voltages exceeds a preset value.

21. The correction device for secondary batteries according to claim 20, further comprising a circuit for discriminating whether the detected variation exceeds the preset value.

22. The correction device for secondary batteries according to claim 20, wherein said discharge circuit includes a plurality of switch elements and a plurality of resistor elements connected in series, said discharge circuit being connected in parallel to both ends of each of the at least two secondary batteries.

23. The correction device for secondary batteries according to claim 20, wherein said voltage difference detection circuit detects a difference between the maximum terminal value and a minimum terminal voltage of at least two secondary batteries.

24. A correction method of correcting a difference among secondary batteries connected in series during a charge operation, comprising the steps of:

directly detecting a terminal voltage of each of at least two secondary batteries connected in series;

detecting a variation in said terminal voltages of said at least two secondary batteries; and discharging one of the at least two secondary batteries which has a maximum terminal voltage, when the variation exceeds a preset value.

* * * * *